(12) United States Patent
Nolfi et al.

(10) Patent No.: US 11,333,286 B2
(45) Date of Patent: May 17, 2022

(54) SECURE, TRACKABLE FOREIGN MATERIAL EXCLUSION DEVICE

(71) Applicant: ADVANCED F.M.E. PRODUCTS, INC., Mentor, OH (US)

(72) Inventors: Thomas J. Nolfi, Chardon, OH (US); Chase Penix, Painesville, OH (US)

(73) Assignee: ADVANCED F.M.E. PRODUCTS, INC., Mentor, OH (US)

( * ) Notice: Subject to any disclaimer, the term of this patent is extended or adjusted under 35 U.S.C. 154(b) by 270 days.

(21) Appl. No.: 16/742,338

(22) Filed: Jan. 14, 2020

(65) Prior Publication Data

US 2020/0232591 A1   Jul. 23, 2020

Related U.S. Application Data

(60) Provisional application No. 62/793,550, filed on Jan. 17, 2019.

(51) Int. Cl.
*F16L 55/10* (2006.01)
*F16L 55/11* (2006.01)

(52) U.S. Cl.
CPC ................. *F16L 55/1141* (2013.01)

(58) Field of Classification Search
CPC .................................................. F16L 55/1141
USPC ........................................ 138/89, 104, 96 R
See application file for complete search history.

(56) References Cited

U.S. PATENT DOCUMENTS

| | | | | |
|---|---|---|---|---|
| 2,310,351 A | * | 2/1943 | Bowan | F16L 41/16 138/89 |
| 3,044,496 A | * | 7/1962 | Maisch | F16L 55/132 138/89 |
| 3,889,714 A | * | 6/1975 | Wilger | F16L 55/132 138/89 |
| 4,503,880 A | * | 3/1985 | Hochman | F16L 55/132 137/15.03 |
| 5,208,937 A | * | 5/1993 | Cooper | B08B 9/055 134/8 |
| 6,506,014 B1 | | 1/2003 | Nolfi et al. | |
| 6,824,356 B2 | | 11/2004 | Nolfi et al. | |
| 7,533,698 B2 | | 5/2009 | Nolfi et al. | |
| 8,967,203 B2 | | 3/2015 | Nolfi et al. | |
| 9,133,727 B2 | | 9/2015 | Nolfi et al. | |
| 9,476,534 B2 | | 10/2016 | Nolfi et al. | |
| 9,938,859 B2 | | 4/2018 | Nolfi et al. | |
| 10,436,111 B2 | * | 10/2019 | Nolfi | F02C 7/00 |
| 2014/0261831 A1 | * | 9/2014 | Nolfi | F16L 55/105 138/89 |

* cited by examiner

*Primary Examiner* — James F Hook
(74) *Attorney, Agent, or Firm* — Hudak, Shunk & Farine Co. LPA (57) ABSTRACT

A foreign material exclusion device that is adapted to seal an area of a construction, such as a tube or pipe, from foreign material or debris temporarily, wherein the device has a resilient body for holding the device within a particular construction. The device also includes a post extending through the body and a base connected to a first end of the post, the base including a flange for maintaining the body on the post. The device further includes a cap that is securely locked to a second end of the post to prevent the post being withdrawn from the cap. The device body is captured between the base and cap.

17 Claims, 3 Drawing Sheets

SECURE, TRACKABLE FOREIGN MATERIAL EXCLUSION DEVICE

FIELD OF THE INVENTION

The present invention relates to a foreign material exclusion device that is adapted to seal an area of a construction, such as a tube or pipe, from foreign material or debris temporarily, wherein the device has a resilient body for holding the device within a particular construction. The device also includes a post extending through the body and a base connected to a first end of the post, the base including a flange for maintaining the body on the post. The device further includes a cap that is securely locked to a second end of the post to prevent the post from being withdrawn from the cap. The device body is captured between the base and cap.

BACKGROUND OF THE INVENTION

During assembly or maintenance of various assemblies or constructions in numerous industries, it is desirable to prevent the introduction of debris into one or more areas to prevent i) damage to various objects or ii) safety hazards. Foreign material exclusion is of particular concern in the field of power generation and supply, whether nuclear, hydro or fossil fueled in order to prevent or reduce power shortages and outages, as well as increase nuclear safety.

While undergoing maintenance or assembly, small parts, screws, bolts, or other foreign objects can fall into openings and crevices. If not prevented, retrieved or noticed, such parts can have the potential to damage or even destroy a particular unit and produce varying consequences, potentially catastrophic.

In order to provide foreign material exclusion, various devices have been proposed, see for example U.S. Pat. Nos. 6,506,014, 6,824,356, 7,533,698, 8,967,203, 9,133,727, 9,938,859 and 9,476,534.

SUMMARY OF THE INVENTION

Even though the above-identified art provides useful, alternative solutions for foreign material exclusion, the art still needs secure, trackable foreign material exclusion devices that can be readily identified and accounted for, among other desirable features.

The foreign material exclusion devices disclosed herein serve the needs described above, as well as others, as apparent from the description set forth herein.

Therefore, in one embodiment of the present invention, a foreign material exclusion device is provided having a body captured between a base and a cap, wherein a post extends through the body between the base and the cap, with the cap securely locked to the post via a mated connection that prevents the post from being withdrawn from the cap. In a further embodiment, the cap has an internal cavity in which an end of the post is located, with a latch being present in the internal cavity that locks the post to the cap after insertion of the post.

In an additional embodiment, the latch is a projection that extends into a notch on the post for locking the cap to the post.

In still another embodiment, the cap includes an internal part that is constructed of X-ray visible material such as metal piece, preferably a nut, washer or another metal piece of a desired shape for example formed by stamping in one embodiment, designed in a manner to be X-ray visible in the x, y and z dimensions. The piece is also designed to provide additional strength to the cap assembly. The X-ray visible piece has an aperture through which a projection present in the cap extends at least part of the way therethrough in some embodiments.

Another embodiment of the invention provides the device with a cap including an aperture that extends completely through the cap from a first side to a second side thereof, and preferably substantially perpendicular to a longitudinal axis of the device. The aperture provides a means to facilitate removal of the device from a construction such as a tube or pipe using an appropriate tool.

A further embodiment of the present invention includes a device having a cap that comprises at least two pieces that lock together, with one end of the post being captured or otherwise secured when the pieces are locked.

In still a further embodiment, one or more of the base and cap are provided with a planar surface that can be marked with indicia, which serves to identify an individual device and is quite useful for inventory tracking.

In yet another embodiment, the post is disposed at an angle with respect to a longitudinal axis of the device in order to maintain a greater interior opening size between a top surface of the body and a base of the cap to facilitate removal of the device from a construction. The angle between the longitudinal axis of the device and the post, at the location where the post enters the cap, ranges from about 10 to about 25 degrees.

The devices of the present invention offer many benefits in the field of foreign material exclusion. Construction of a one piece design below the resilient body eliminates the chance of an assembled device having multiple pieces failing below the body. Such a failure could introduce debris into the system designed to be protected by the device.

The device is provided with X-ray visibility by the inclusion of a preferably metal part encased within a cap of the device. In addition, the cap also allows provision for RFID or other electronic communication devices to be located therein.

Both the cap and base have provisions for one or more of product information and customer marking, enabling an excellent mechanism for inventory control.

In various embodiments the cap has an aperture that permits use of a lanyard when desired or aids in retrieval with a hook when lanyard use is not possible, for example when a machine tool is locked into the tube or pipe or other construction for machining where the device is placed.

Additionally, the cap is designed to receive one or more and preferably two posts disposed at an angle that is non-parallel to a longitudinal axis of the device in order to help create a desired opening between two or more posts. The non-parallel angle additionally provides resistance within the resilient body so that there is enough rigidity for user handling, while not restricting transit of the post through the sponge and away from machining tools placed adjacent thereto in use.

For the avoidance of doubt, it is understood that while various embodiments of the invention are described individually, it should be clear that two or more of the embodiments can, and often times are present in a single device according to the present invention.

Therefore, in one aspect, a foreign material exclusion device is disclosed, comprising a resilient body, wherein the body is adapted to seal a first side of a cavity in a construction or system from a second side of the cavity, the body comprising one or more of a resilient and elastic material that can be compressed to fit into the cavity and then be re-expanded to self-support the device within the cavity, the body having a length between a first end and a second end and a width; a post extending through the body between the first end and the second end; a base connected to the first end of the post and having a flange for preventing the body from being removed from the first end of the post; and a cap locked to a second end of the post by a locking mechanism, the cap having an internal cavity in which the second end of the post is located, wherein the locking mechanism includes a cap locking segment located in the internal cavity of the cap that mates with a post locking segment of the post and prevents the post from being withdrawn from the cap, and wherein the body is captured between the base and the cap.

In a further embodiment the cap locking segment comprises one or more projections, one or more recesses, or a combination thereof, and wherein the post locking segment comprises one or more projections, one or more recesses, or a combination thereof. In a further embodiment, the cap locking segment comprises a projection which extends into a post locking segment in the form of a recess notch on the post for locking the cap to the post. Still further, the second end of the post is rounded to aid with insertion through the body. In a further embodiment, an X-ray visible material is fully encased in the cap for allowing the device to be visible to X-rays. In yet another embodiment, the X-ray visible material is one or more of a metal stamping, a metal piece such as a metal washer or metal nut having an aperture through which a projection present in the internal cavity of the cap extends at least part of the way therethrough. In a further embodiment, the cap has an internal stop in contact with a tip of the second end of the post that prevents the post from being further extended into the cap. In yet another embodiment, the cap includes an aperture that extends completely through the cap from a first side to a second side thereof. In a further embodiment, two of the posts are present, wherein the posts are spaced apart from each other. In yet another embodiment, the cap comprises at least two pieces that lock together, with the second end of the post therebetween, in order to lock the cap to the post. In a further embodiment, one or more of the base and cap include a planar surface that can be marked with indicia. In yet another embodiment, the cap has a bottom with an aperture, wherein the post extends into the bottom of the cap through the aperture. In a further embodiment, the second end of the post extends into the bottom of the cap at a non-parallel angle measured with respect to a longitudinal axis of the device. In still another embodiment, the post extends into the bottom of a cap at an angle between about 10 to about 25 degrees with respect to the longitudinal axis of the device. In a further embodiment, the base and the post are integrally formed as a one-piece construction. In yet another embodiment, the body comprises one or more of a polymer foam and a rubber foam.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "upper", "down," "lower", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

The foreign material exclusion devices of the present invention are especially adapted to be temporarily positioned in a construction, for example, but not limited to, a tube, a pipe, an orifice, a cavity, or the like to seal off a potentially sensitive area of the construction from foreign materials, debris or the like. As an example, it is desirable to protect a construction such as a turbine in a power plant from debris as the turbine can be catastrophically damaged by parts, metal shavings or the like. Foreign material exclusion devices can be utilized during construction, assembly, repair or the like of a portion of a product such as, but not limited to, a turbine, a pump, a fan, a housing, a boiler tube, an engine or any other device with limited access openings and/or cavities.

Figure 1:
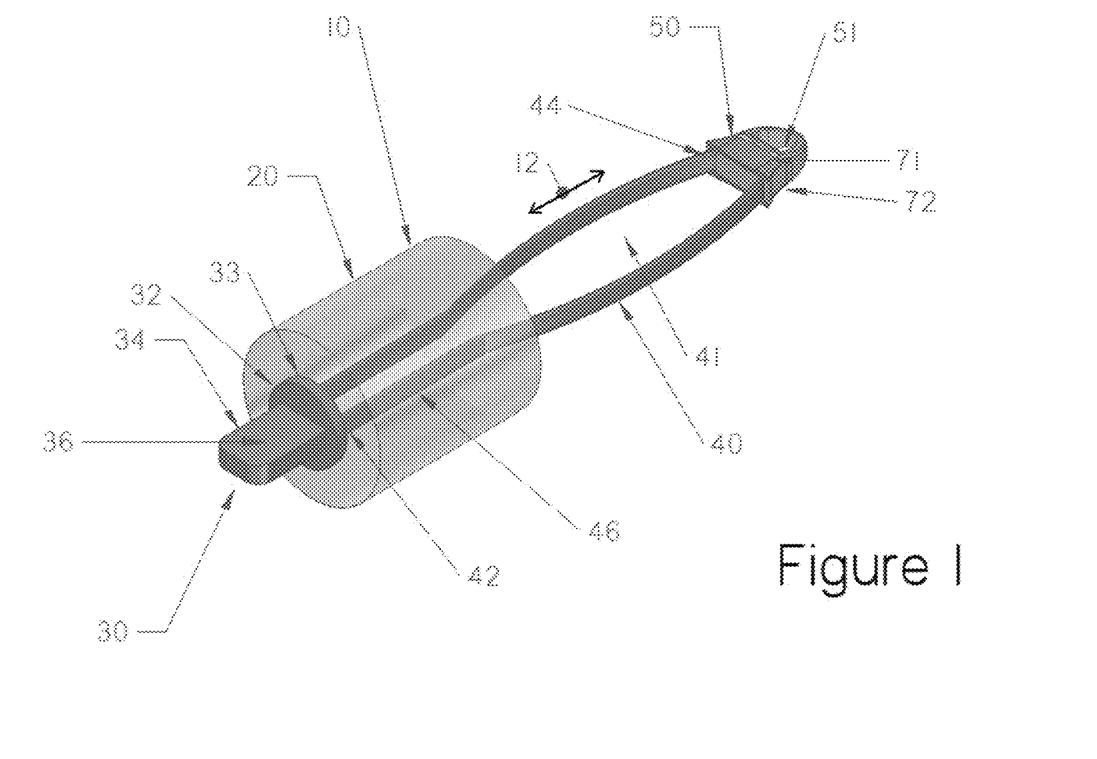
FIG. 1 is a bottom right perspective view of one embodiment of a foreign material exclusion device of the present invention.
Figure 2:
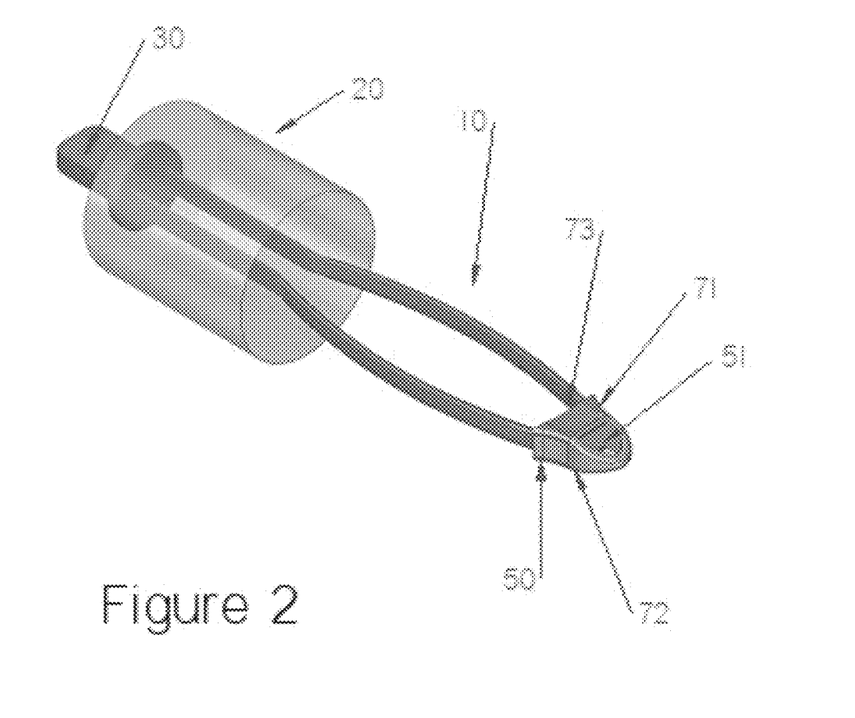
FIG. 2 is a front right perspective view of the embodiment illustrated in FIG. 1.

Referring now to the drawings, wherein like parts or components are represented by like or identical reference numbers throughout the several views, FIGS. 1 and 2 illustrate one embodiment of a foreign material exclusion device 10 which includes a resilient body 20, a base 30, a post 40 and a cap 50. The post 40 can be connected to cap 50 through the use of one or more of mechanical connection, adhesive, fastener or any other suitable connection. In FIG. 1, base 30 is shown permanently connected to post 40. In a preferred embodiment, base 30 is combined with one or more posts 40 as a single unit utilizing a molding process, such as injection molding. However, it is to be understood that in an alternative embodiment, the base may be operatively connected to the post through the use of a fastener, adhesive or any other connection that would allow the base to be removed from the post. The base 30 is preferably connected to the post 40 permanently, such as when the post and base are formed from a single unit utilizing a molding process, such as injection molding.

When the base 30 is formed integrally with post 40, no additional fastening element is required. In addition, an integral assembly generally has increased strength over a non-integral construction. An integral post and base assembly also provides strength by spreading axial, radial and torsional forces throughout the assembly.

Base 30 is connected to post 40 at a first end 42 of the post. Base 30 includes a flange 32 that extends laterally or outwardly with respect to a longitudinal central axis 12 of device 10 or post 40. The flange 32 extends outwardly from the axis 12 of the device and forms a rim 33. The ultimate dimensions, such as width and thickness of flange 32 generally depend upon the size of the body 20 to be utilized in conjunction therewith. The shape and design of the flange depends on factor such as size of the body, composition of the body and constructions in which the foreign material exclusion device 10 will be utilized. While the flange is rectangular in shape in the figures, it is to be understood that other shapes can be utilized, such as but not limited to circular or oblong flanges.

In a preferred embodiment, the base 30 includes a projection 34 that extends downwardly from a bottom surface of base 30. Projection 34 preferably includes a marking surface 36 that can include or later be made to include identifying characteristics of the foreign material exclusion device 10, such as lot numbers, manufacturing dates, composition, or the like which are useable by the user to inventory and track the devices. Projection 34 can be in the form of a tang which provides room to include a part number and/or lot code. A lot code is important for traceability through production and customer use process. The lot code can include information such as production date, batch code or other product information. In various industries where the device 10 is used, part traceability is critical in areas such as boilers, turbines and high purity piping systems. The part number is important in insuring that users identify the correct size where many size options exist. Contact information can also be provided on the device in additional embodiments.

Post 40 includes the first end 42 and a second end 44 opposite the first end, with a central section 46 therebetween. The post preferably has a longitudinal length that is greater than the maximum longitudinal length of body 20.

In some embodiments two or more posts 40 are utilized, see FIG. 1 for example. Utilization of a plurality of posts disposed in spaced apart relationship facilitates creation of a post pocket 41 located therebetween. The post pocket 41 allows a tool or other removal aid to be situated between two or more posts and aid withdrawal of the foreign material exclusion device 10 from a construction. For example, a hook can be passed between post 40 into post pocket 41 and the device 10 can be pulled outwardly from a construction with the hook bearing on one or more of the post 40 and cap 50.

The length of the post 40 can vary depending upon design factors such as the length or height of the body 20, and composition of the body. The maximum width of the post 40 measured in a direction perpendicular to central axis 12 can also vary depending on factors such as size and composition of the body.

Figure 3:
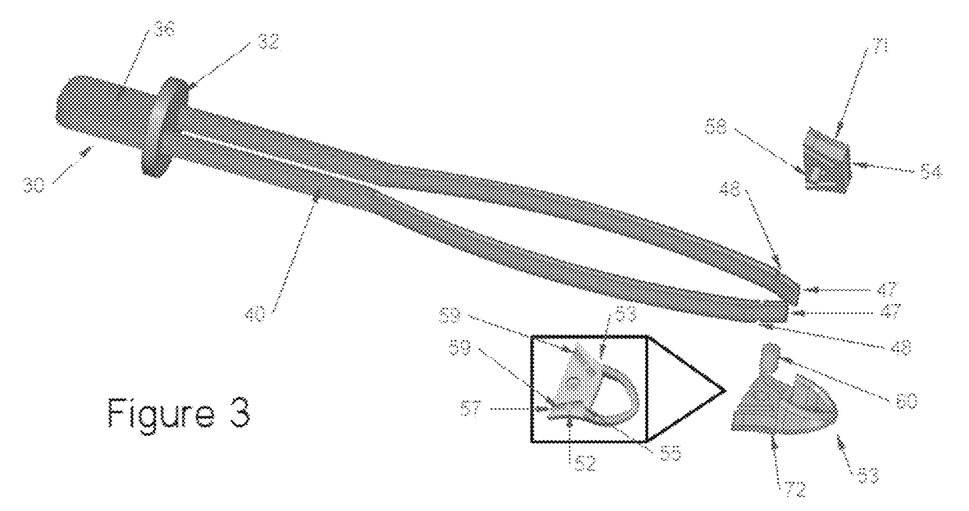
FIG. 3 is an exploded view of one embodiment of a base, post and cap suitable for use in the present invention.

In some embodiments, in order to aid in the insertion of the post 40 through body 20, second end 44 of post 40 has a rounded end 47, see FIG. 3 for example. A base of body 20 is generally inserted onto post 40 over rounded end 47. Body 20 is moved downwardly along the post 40 until the base of the body contacts flange 32 of base 30.

Post 40 also includes a portion of a lock or latch that mates with the cap 50 and prevents the post from being withdrawn from the cap. The locking or latching mechanism including the part and cap has structure that interlocks the two parts.

The locking mechanism includes a locking segment located in the internal cavity of the cap that mates with a locking segment of the post. In one embodiment, the lock or latch of the device 10 is designed as an assembly having a recess and a projection. Each of the post and base can have locking segments that comprise one or more projections and/or recesses which cooperate with each other in order to lock the cap 50 and post 40 together. In the embodiment shown in FIGS. 3 and 4, the post comprises a recess 48 which mates with a projection 52 present in the cap.

Figure 4:
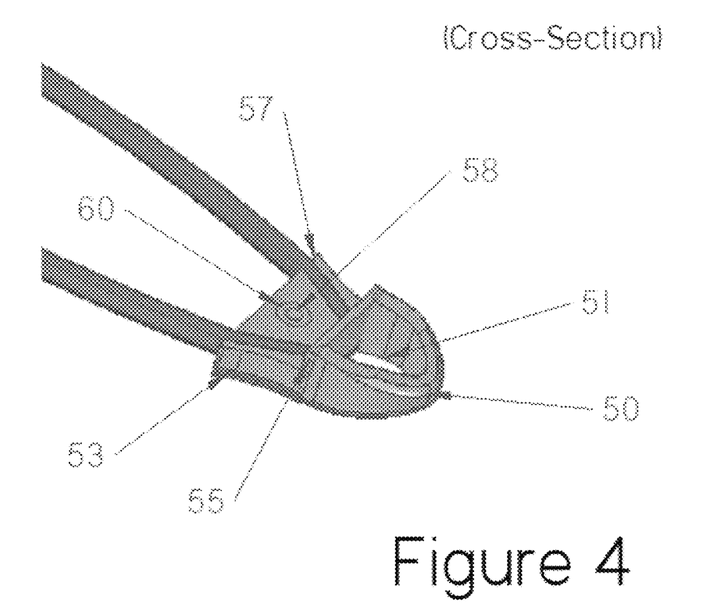
FIG. 4 is a detailed view showing a portion of the cap, posts and an X-ray visible metal piece present on a projection of the cap assembly.
Figure 5:
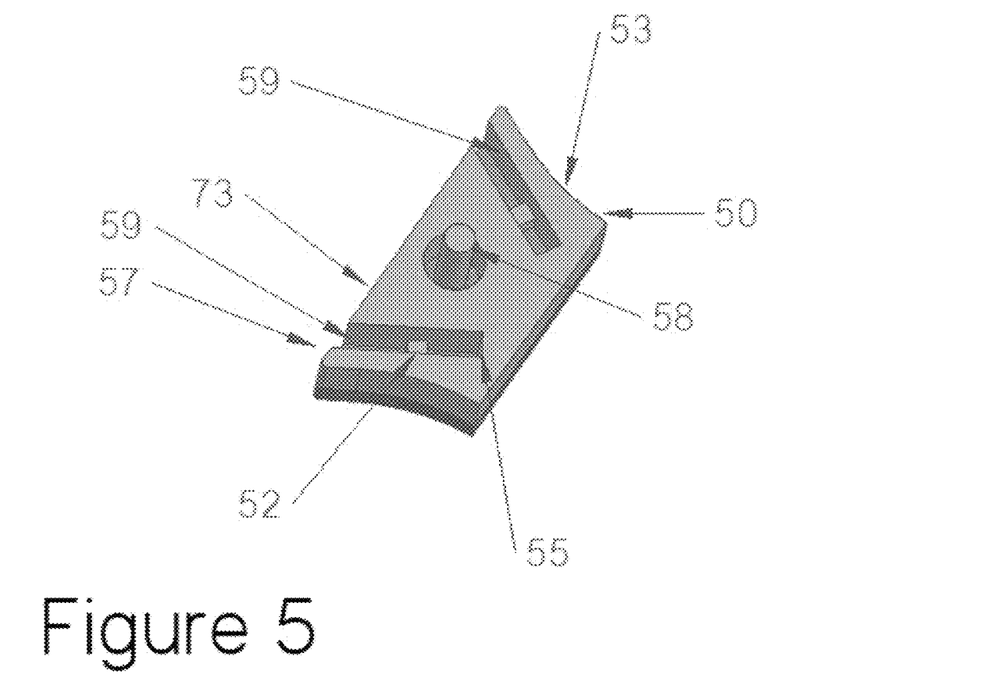
FIG. 5 is a perspective view of one embodiment of a section of a cap of the present invention including a latch and end stops designed to lock a post to the cap.
Figure 6:
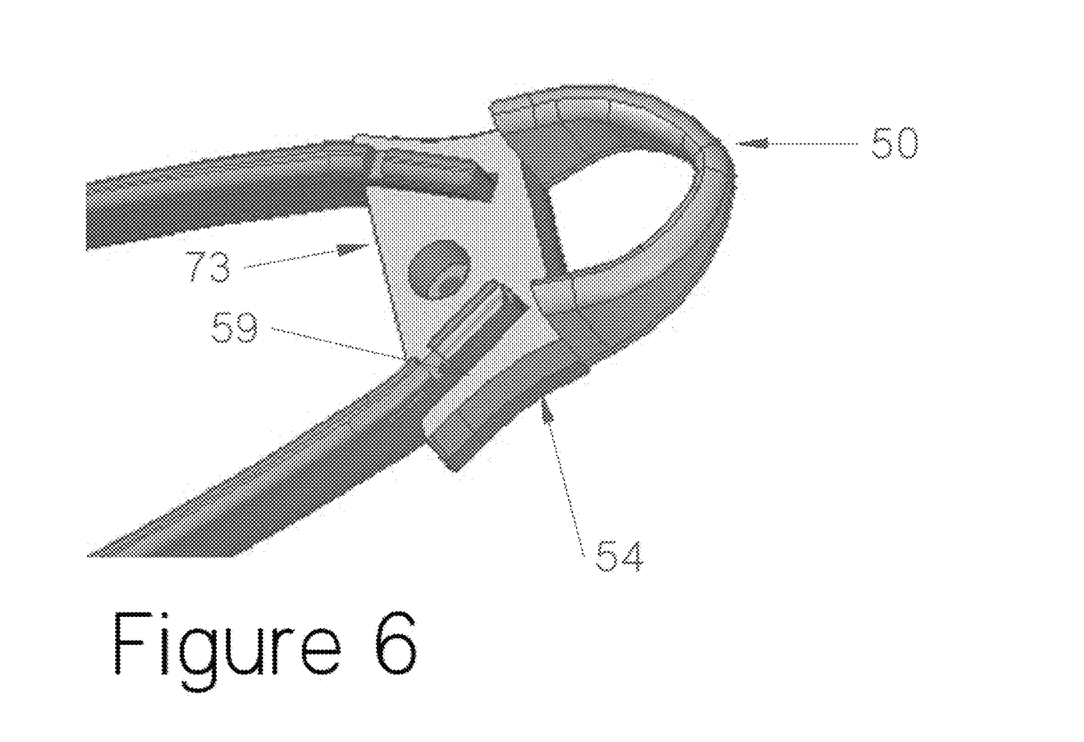
FIG. 6 is a further embodiment of a portion of a cap and post arrangement.

Cap 50 is locked to post 40 after body 20 has been inserted thereon such that the body 20 is captured between base 30 and cap 50, with post 40 extending through the body 20. Cap 50 is preferably formed from two or more pieces, with two pieces being shown in the figures. First piece 53 is illustrated in FIGS. 4 and 5 and second piece 54 is illustrated in FIG. 6. The cap includes at least one aperture 57 that leads to an internal cavity 59. The internal cavity 59 includes a portion of the lock or latch, such as projection 52 as described herein, which is used to lock the cap 50 to post 40. A portion of the post extends through aperture 57. The cap also includes an end stop 55 which is designed to abut rounded end 47 of post 40 and prevent the post from being extended a further distance into cap 50.

Internal cavity 59 of cap 50 is also sized to accommodate an X-ray visible component such as a piece of metal in cap 50. In order to securely house and hold the piece of metal 60, the cap includes a projection 59 extending inwardly into the internal cavity 59 which mates with an aperture present in metal piece 60. The metal piece 60 can be of any form such as an engineered X-ray reflective item, stamping washer, nut or the like which is visible to X-rays. The metal piece is fully encased in the cap and not exposed to the surrounding environment. Having the metal piece present in the device 10 allows a user to locate the foreign material exclusion device within a construction when it is not visible to the naked eye. In an additional embodiment, the internal cavity 59 can be utilized to house an RFID device or bluetooth-capable device, such as to facilitate identification of the device 10.

Cap 50 also includes an aperture 51 of a fixed size that extends through cap 50 from a first side 71 to a second side 72 as illustrated in FIGS. 1 and 2. The aperture is useful in many different applications. For example, a retrieval aid such as a lanyard, rope or cable can be inserted therethrough to allow the foreign material exclusion device 10 to be extracted from a construction after use or as desired. The retrieval aid also permits identification that the foreign material exclusion device is in use in a construction. Additionally, a hook or other device can be inserted through the aperture to aid in positioning and/or retrieval of the device in a construction. Aperture 51 also aids in storage of the device when not in use, enabling the device to be hung on a hook or other storage device.

The pieces 53 and 54 of cap 50 are connected in any suitable manner. In various embodiments the pieces can be snap-fit to each other, adhered or otherwise mated to each other.

The cap 50 has a bottom surface 73 that has a longitudinal axis and is preferably planar in one embodiment. In a preferred embodiment, the post is inserted into the bottom surface 73 of cap 50 at an angle that is non-perpendicular to the longitudinal axis of bottom surface 73 or non-parallel to the longitudinal axis of the device. For example, the post can be inserted at an angle between 10° and 25° measured from an angle perpendicular to the longitudinal axis of the bottom surface 73 of cap 50 or at an angle from the longitudinal axis of the device. The non-perpendicular angle between the portion of the post 40 inserted into the cap 50 measured in relation to a longitudinal axis of the device or, stated in another manner, an angle perpendicular to a bottom surface 73 of cap 50 has numerous benefits. For example, the desired angle allows the post to traverse through the body with a desired, precise resistance. In addition, the angle also prevents body 20 from sliding towards the cap 50, especially when used in an upside down application, wherein the device is inserted into a construction whereby the body 20 is located above cap 50. Unrestrained movement of body 20 could interfere with use of the device 10.

It is also advantageous that the design of the device 10 is ergonomic and allows for ease of handling by user wearing gloves.

The cap is preferably formed from a polymeric material, for example by injection molding. Other materials can be utilized. Polymers include one or more of homopolymers, copolymers and block copolymers. The choice of polymer can vary depending on factors including the type of construction with which the device will be utilized. In one embodiment, the cap is formed from nylon.

The composition of body 20 of the exclusion device is generally a polymer, a rubber, or a polymer or rubber foam. It is important that body is elastic or resilient in nature so that it can be compressed to fit into a desired opening, and yet re-expand to provide a snug fit within or about the opening. The resiliency of body allows the foreign material exclusion device to hold itself in place in a predetermined location or orifice.

The actual size dimensions, i.e. the length, width, and thickness of body of foreign material exclusion devices of the present invention will vary depending on the size and shape of the orifice, tube, opening, etc. which is to be protected or isolated. That is, body of foreign material exclusion device is not limited to one specific geometric or random shape or size such as a cylinder, cube, block, or the like, but is custom tailored or profile fit to the dimensions of generally each cavity or turbine assembly orifice. That said, preferred foreign material exclusion devices have a body that is substantially cylindrical or block shaped. Body is dimensioned to provide a resilient snug fit with the above-mentioned orifice which thereby provides a barrier to the entrance of foreign materials. Foreign materials can generally be defined as any object, particle or the like such as, but not limited to, nuts, bolts, metal bits, debris, hand tools, sockets, measuring devices, or any other material not designed to be located in a desired area of a turbine assembly. Dimensions can vary widely by application, with the primary goal of foreign object exclusion requiring sufficient strength to retain the heaviest object used in that portion of the protected device.

Body of the material exclusion device of the present invention is generally formed from a polymer or rubber, and is preferably a foam or foam like material. Foams are cellular materials generally having small hollow spaces which occur during manufacture of the foam. If the cells are fully surrounded by cell walls, the foam is called closed cell foam. In mixed cell foams, the cell walls are partially perforated. In open cell foams, the cells have gas phase connections to each other. Any of the above-mentioned foam types can be utilized in the present invention so long as the foams can be resiliently compressed and prevent the foreign material from entering a predetermined area of the turbine. Generally, open cell foams are preferred as they are more flexible and elastomeric when compared to closed cell foams which tend to be compression resistant.

Suitable polymer compositions which can be foamed to form the body of the present invention include polyethylene, e.g. low density polyethylene and high density polyethylene (HDPE), polypropylene, and copolymers of ethylene or propylene and a monoethylenically unsaturated monomer copolymerizable therewith. Other suitable polyolefins include branched polypropylene homopolymer and branched copolymers of polypropylene. Examples also include copolymers of ethylene and acrylic acid or methyl acrylic acid and $C_1$-$C_4$ alkyl esters or ionomeric derivatives thereof; ethylene vinyl-acetate copolymers; ethylene/carbon monoxide copolymers; anhydride containing olefin copolymers of a diene; copolymers of ethylene and an alpha-olefin having ultra low molecular weight (i.e., densities less than 0.92 g/cc); blends of all of the above resins; blends thereof with polyethylene (high, intermediate or low density), etc.

Other suitable polymeric compositions which may be used in the practice of the invention include, but are not limited to, polyesters, polyamides, polyvinylchloride, polyvinylidene chloride, polycarbonates, polyurethanes, and polystyrene resins.

Rubbers include silicones and copolymers of ethylene and propylene and can be prepared by known addition polymerization techniques, including the use of small amounts of a diene such as butadiene. Additional rubber or elastomeric components include various conjugated dienes having from 4-8 carbon atoms such as isobutylene, butadiene, and ethylene/propylene/diene interpolymers may be included in the blend if desired. Rubbers include the aromatic containing rubbers such as styrene, butadiene rubber and the like. Moreover, additional components such as crosslinking agents designed to provide latent crosslinking of the ethylenic or propylenic polymer, such as silane functional crosslinking agents, or covalent or ionic crosslinking agents, may be included if desired.

The thermoplastic polymer material or blend is melt processed in a conventional manner by feeding, melting, and metering into a conventional melt processing apparatus such as an extruder. A volatile blowing agent and an optional crosslinking agent are mixed with the polyolefin polymer or blend under a pressure suitable to form a flowable gel or admixture. A crosslinking agent may be added in an amount which is sufficient to initiate crosslinking and raise the pressure of the mixture to less than that pressure which causes melt fracture of the polymer to occur. The term "melt fracture" is used in the art to describe a melt flow instability of a polymer as it is extruded through a die, which flow instability causes voids and/or other irregularities in the final product. Any other known methods for producing foam compositions can also be utilized to form the foam utilized in the present invention.

The foam blends are generally prepared by heating the desired polymer or rubber to form a plasticized or melt polymer material, incorporating therein a blowing agent to form a foamable gel, and extruding the gel through a die to form the foam product. Prior to mixing with the blowing agent, the resin or blend is heated to a temperature at or above its glass transition temperature or melting point. The blowing agent may be incorporated or mixed into the melt polymer material by any means known in the art, such as with an extruder, mixture, blender, or the like. The blowing agent is mixed with the melt polymer material at an elevated pressure sufficient to prevent substantial expansion of the melt polymer material and to generally disperse the blowing agent homogeneously therein. Optionally, a nucleating agent may be blended in the polymer melt or dry blended with the polymer material prior to plasticizing or melting. The foamable gel or melt is typically cooled to a lower temperature to optimize physical characteristics of the foam structure. The gel may be cooled in the extruder or other mixing device or in separate coolers. The gel is then extruded or conveyed through a die of desired shape to a zone of reduced or lower pressure to form the foam product. The zone of lower pressure is at a pressure lower than that in which the foamable gel is maintained prior to extrusion through the die. The lower pressure may be super-atmospheric or sub-atmospheric (vacuum), but is preferably at an atmospherical level.

The polymer or rubber foam may be open or closed-celled, as desired. The percentage of open cells can be controlled, as is well known in the art, by appropriate selection of blowing agents, additives, polymers, and processing parameters, such as temperatures, pressures, and extrusion rates. A preferred foam of the present invention is polyester and is available from sources including Orbis Manufacturing of Mentor, Ohio.

While the density of the foam can vary, the foams of the present invention are generally considered lightweight and range generally from about 1 to about 200 or 300 kg/m$^3$, desirably from about 5 to about 150 kg/m$^3$, and preferably from about 10 to 20 to about 50, about 75, or about 100 kg/m$^3$.

It is also possible to add various additives such as inorganic fillers, pigments, anti-oxidants, acid scavengers, ultraviolet absorbers, flame retardants, surfactants, processing aids, extrusion aids and the like is suitable as known to those of ordinary skill in the art.

Other additives include inorganic substances such as calcium carbonate, talc, clay, titanium oxide, silica, barium sulfate, diatomaceous earth and the like, carbon dioxide generated by the combination of a bicarbonate or a carbonate of sodium, potassium, ammonium or the like and an inorganic or organic acid such as boric acid, citric acid, tartaric acid or the like, thermal decomposition type chemical foaming agents such as azodicarbonamide, benzene-sulfonyl hydrazide, toluene-sulfonyl hydrazide and the like.

The volatile foaming agents usable in this invention generally have a boiling point temperature range of −90° C. to +80° C., and include, but are not limited to, aliphatic hydrocarbons such as n-pentane, isopentane, neopentane, isobutene, n-butane, propane, ethane and the like; fluorochlorinated hydrocarbons such as dichlorotetrafluoroethane, trifluoroethane, trichloromonofluoromethane, dichloro-difluoromethane, dichloromonofluoromathane, and the like. Among them, the non-fully halogenated hydrocarbons are preferred because of environmental considerations. Particularly preferred among the non-fully halogenated hydrocarbons are partially or fully fluorinated hydrocarbons and non-fully halogenated fluorochlorinated hydrocarbons. Examples of these include 1-chloro-1,1-fluoro-ethane, 1,1,1,2-tetrafluoroethane and 1,1-difluoroethane. Particularly preferred among the aliphatic hydrocarbons are isobutene and isobutene/n-butane mixtures. Other blowing agents which may be employed include alcohols such as methanol and ethanol. Also contemplated are inorganic blowing agents such as carbon dioxide, water, nitrogen, argon and combinations thereof, as well as combinations of these inorganic blowing agents with hydrocarbon and/or halogenated hydrocarbon blowing agents. Also decomposable blowing agents, such as azobisformamide, may be incorporated with the volatile foaming agents. Mixtures of any or all of these volatile foaming agents are also contemplated within the scope of the invention. Also contemplated are combinations including water and/or carbon dioxide as the primary blowing agent.

Optionally, but preferably, a flame retardant, resistant, or quenching coating or covering is applied to any of the foreign material exclusion devices described in this application, preferably on at least body thereof. The flame retardant coating or covering can be applied to one or more sides of the body, especially the portion thereof which can be exposed to high temperature debris, chips, filings, etc., such as from a welding process on the construction. The coating or covering is also heat resistant. The coating or covering is any suitable thickness to provide the desired flame or heat resistant properties. In one embodiment, the coating or covering is on top of or in surface contact with at least a portion of the device, and in a second embodiment, saturates a portion of the body of the device in addition to being present on a surface. Coating or covering on the foreign material exclusion device has a sufficient thickness to achieve the desired goal of providing flame retardant, flame resistant, or the like properties. Coating or covering thickness may vary from surface to surface and vary on a single surface, and ranges generally from about 0.010 to about 0.25 inches, desirably from about 0.020 to about 0.20 inches, and preferably from 0.05 to about 0.15 inches.

Such coatings are well known in the art and are generally latexes such as HCF from PDI, Inc. of Circle Pines, Minn. Coverings of the present invention include, but are not limited to, woven and nonwoven, natural and synthetic fibers, and are available from many different commercial sources. In other embodiments, coverings are a layer(s) of organic or inorganic material, or a combination thereof, such as a polymer layer or a graphite layer.

The flame retardant coating or covering or combination thereof, is applied to at least one surface of a foreign material exclusion device of the invention utilizing one or more methods, including but not limited to, spray coating, roll coating, screen printing, bonding, adhesive, double sided tape or the like. Flame retardant coverings in one embodiment are applied utilizing an adhesive comprising a hot melt adhesive, an epoxy, a polyurethane, a phenolic resin or the like, with the adhesive disposed between the covering and foreign material exclusion device body surface. Hot melt adhesives are preferred in one embodiment. In a preferred embodiment, a sheet of body material having a predetermined thickness is coated with the coating on at least one surface by roll coating, spraying or the like. Afterwards, a desired number of device bodies are formed from the coated sheet. In one embodiment, body is cut from the sheet, preferably with a die cutting apparatus, waterjet cutting apparatus, or cold laser as known in the art.

For the avoidance of doubt, the products and device of the present invention encompass all possible combinations of the components, including various ranges of said components, disclosed herein. It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

In accordance with the patent statutes, the best mode and preferred embodiment have been set forth; the scope of the invention is not limited thereto, but rather by the scope of the attached claims.

What is claimed is:

1. A foreign material exclusion device, comprising:
   a resilient body, wherein the body is adapted to seal a first side of a cavity in a construction or system from a second side of the cavity, the body comprising one or more of a resilient and elastic material that can be compressed to fit into the cavity and then be re-expanded to self-support the device within the cavity, the body having a length between a first end and a second end and a width;
   a first post extending through the body between the first end and the second end and a second post extending through the body between the first end and the second end, wherein the second post is spaced apart from the first post along an entire length thereof;
   a base connected to a first end of the first post and a first end of the second post, the base having a flange for preventing the body from being removed from the first end of the post; and
   a cap locked to a second end of the first post and a second end of the second post by a locking mechanism, the cap having a first internal cavity in which the second end of the first post is located, the cap having a second internal cavity in which the second end of the second post is located, wherein the locking mechanism includes a first cap locking segment in the first internal cavity of the cap that mates with a first post locking segment portion of the first post and prevents the first post from being withdrawn from the cap, wherein the locking mechanism includes a second cap locking segment in the second internal cavity of the cap that mates with a second post locking segment portion of the second post and prevents the second post from being withdrawn from the cap, and wherein the body is captured between the base and the cap.

2. The device according to claim 1, wherein the first and the second cap locking segments comprises one or more projections, one or more recesses, or a combination thereof, and wherein the first and the second post locking segments comprise one or more projections, one or more recesses, or a combination thereof.

3. The device according to claim 2, wherein the first cap locking segment comprises a first projection which extends into the first post locking segment in the form of a recess on the first post for locking the cap to the first post, wherein the second cap locking segment comprises a second projection which extends into the second post locking segment in the form of a recess on the second post for locking the cap to the second post.

4. The device according to claim 3, wherein the second end of the first post is rounded to aid with insertion through the body, wherein the second end of the second post is rounded to aid with insertion through the body.

5. The device according to claim 3, wherein the cap has a first internal stop in contact with a tip of the second end of the first post that prevents the first post from being further extended into the cap, and a second internal stop in contact with a tip of the second end of the second post that prevents the second post from being further extended into the cap.

6. The device according to claim 1, wherein an X-ray visible material is fully encased in the cap for allowing the device to be visible to X-rays.

7. The device according to 6, wherein the X-ray visible material is one or more of a metal stamping, metal washer or a metal nut having an aperture through which a projection present in a third internal cavity of the cap extends at least part of the way therethrough.

8. The device according to claim 1, wherein the cap includes an aperture that extends completely through the cap from a first side to a second side thereof.

9. The device according to claim 1, wherein a post pocket is present and located between the first post and the second posts that allows a tool to be situated between the posts to aid withdrawal of the foreign material exclusion device to from a construction, wherein the post pocket is located between the cap and the second end of the body, both of which form a perimeter of the post pocket along with the first post and the second posts.

10. The device according to claim 1, wherein the cap comprises at least two pieces that lock together, with the second ends of the first post and the second post therebetween, in order to lock the cap to the first and second posts.

11. The device according to claim 1, wherein one or more of the base and cap include a planar surface that can be marked with indicia.

12. The device according to claim 1, wherein the cap has a bottom with a first aperture, wherein the first post extends into the first internal cavity of the cap through the first aperture, wherein the cap bottom has a second aperture, wherein the second post extends into the second internal cavity of the cap through the second aperture.

13. The device according to claim 12, wherein the second end of the first post extends into the bottom of the cap at a non-parallel angle measured with respect to a longitudinal axis of the device, and wherein the second end of the second post extends into the bottom of the cap at a non-parallel angle measured with respect to a longitudinal axis of the device.

14. A device according to claim 13, wherein the first post extends into the bottom of a cap at an angle between about 10 to about 25 degrees with respect to a longitudinal axis of the device, and wherein the second post extends into the bottom of a cap at an angle between about 10 to about 25 degrees with respect to a longitudinal axis of the device.

15. The device according to claim 1, wherein the base the first post, and the second post are integrally formed as a one-piece construction.

16. The device according to claim 1, wherein the body comprises ne or more of a polymer foam and a rubber foam.

17. A foreign material exclusion device, comprising:
   a resilient body, wherein the body is adapted to seal a first side of a cavity in a construction or system from a second side of the cavity, the body comprising one or more of a resilient and elastic material that can be compressed to fit into the cavity and then be re-expanded to self-support the device within the cavity, the body having a length between a first end and a second end and a width;
   a post extending through the body between the first end and the second end;
   a base connected to the first end of the post and having a flange extending laterally with respect to a central longitudinal axis of the device for preventing the body from being removed from the first end of the post wherein the first end of the body is in direct contact with the flange;
   a cap locked to a second end of the post by a locking mechanism, the cap having an internal cavity in which the second end of the post is located, wherein the locking mechanism includes a cap locking segment in the internal cavity of the cap that mates with a post locking segment portion of the post and prevents the post from being withdrawn from the cap, and wherein the body is captured between the base and the cap; and wherein the cap is formed from two r more pieces which are snap-fit or adhered with adhesive to each other, with a first piece having a bottom surface including an aperture forming a first end of the internal cavity and having an end stop that forms a second end of the cavity which terminates inside the cap.

* * * * *

UNITED STATES PATENT AND TRADEMARK OFFICE
CERTIFICATE OF CORRECTION

| | |
|---|---|
| PATENT NO. | : 11,333,286 B2 |
| APPLICATION NO. | : 16/742338 |
| DATED | : May 17, 2022 |
| INVENTOR(S) | : Nolfi et al. |

It is certified that error appears in the above-identified patent and that said Letters Patent is hereby corrected as shown below:

In the Claims

In Claim 17, Column 13, Line 6, delete "r" and replace with -- or --.

Signed and Sealed this
Fifth Day of July, 2022

Katherine Kelly Vidal
*Director of the United States Patent and Trademark Office*